US009618631B2

United States Patent
Zerrouk et al.

(10) Patent No.: US 9,618,631 B2
(45) Date of Patent: Apr. 11, 2017

(54) CRYSTAL BLOCK ARRAY AND METHOD OF MANUFACTURE

(71) Applicant: Zecotek Imaging Systems Singapore Pte Ltd., Singapore (SG)

(72) Inventors: Abdelmounaime Faouzi Zerrouk, Lausanne (CH); Azman Mohd Ariffin, Singapore (SG); Mohammad Naim bin Mohammad Hakim, Singapore (SG)

(73) Assignee: ZECOTEK IMAGING SYSTEMS SINGAPORE PTE LTD., Singapore (SG)

( * ) Notice: Subject to any disclaimer, the term of this patent is extended or adjusted under 35 U.S.C. 154(b) by 0 days.

(21) Appl. No.: 14/272,405

(22) Filed: May 7, 2014

(65) Prior Publication Data

US 2015/0104602 A1 Apr. 16, 2015
US 2017/0052262 A9 Feb. 23, 2017

Related U.S. Application Data

(63) Continuation-in-part of application No. 14/051,328, filed on Oct. 10, 2013, now Pat. No. 9,310,493.

(Continued)

(51) Int. Cl.
*B32B 37/18* (2006.01)
*B32B 38/04* (2006.01)
(Continued)

(52) U.S. Cl.
CPC ............ *G01T 1/202* (2013.01); *G01T 1/2002* (2013.01); *B32B 37/02* (2013.01); *B32B 37/12* (2013.01);
(Continued)

(58) Field of Classification Search
CPC ......... Y10T 156/1079; Y10T 156/1075; Y10T 156/1062; Y10T 156/1059; Y10T 156/1052; Y10T 156/10; Y10T 156/1322; Y10T 156/1317; Y10T 156/13; Y10T 156/12; Y10T 156/14; G09G 3/003;
(Continued)

(56) References Cited

U.S. PATENT DOCUMENTS 4,415,808 A 11/1983 Cusano
4,939,826 A 7/1990 Shoup
(Continued)

FOREIGN PATENT DOCUMENTS

WO WO 2013/101513 A1 7/2013

OTHER PUBLICATIONS

International Search Report, Application No. PCT/IB2014/002023, Mar. 16, 2015.

(Continued)

*Primary Examiner* — Linda L Gray
(74) *Attorney, Agent, or Firm* — Davis Wright Tremaine LLP

(57) ABSTRACT

A novel method of making a crystal block array (configured for coupling with photodetectors as part of an integrated detector module useful in advanced PET scanner systems) is disclosed herein. The novel method comprises a series of cutting, polishing, and assembling steps that utilize reflective sheet material. The crystal block arrays disclosed herein may be of various dimensions and geometries and are amenable to mass production.

10 Claims, 6 Drawing Sheets

Related U.S. Application Data

(60) Provisional application No. 61/712,181, filed on Oct. 10, 2012.

(51) Int. Cl.
*G01T 1/202* (2006.01)
*G01T 1/20* (2006.01)
*B32B 37/02* (2006.01)
*B32B 37/12* (2006.01)
*B32B 38/00* (2006.01)
*B32B 37/14* (2006.01)

(52) U.S. Cl.
CPC .......... *B32B 37/14* (2013.01); *B32B 38/0004* (2013.01); *B32B 2038/045* (2013.01); *Y10T 156/1059* (2015.01); *Y10T 156/1062* (2015.01); *Y10T 156/1075* (2015.01); *Y10T 428/16* (2015.01)

(58) Field of Classification Search
CPC ....... A61B 6/40; A61B 6/4208; A61B 6/4275; A61B 6/48; B32B 33/00; B32B 37/02; B32B 37/12; B32B 37/14; B32B 38/0004; B32B 38/04; B32B 2038/0064; B32B 2038/0068; B32B 2038/045
USPC ......... 378/4–9, 11–20; 125/12, 23.01, 30.01; 83/12, 14, 23, 29, 42, 43, 56; 156/264; 2/4–9, 11–20
See application file for complete search history.

(56) References Cited

U.S. PATENT DOCUMENTS

| | | |
|---|---|---|
| 5,091,650 A | 2/1992 | Uchida et al. |
| 5,319,204 A | 6/1994 | Wong |
| 5,453,623 A | 9/1995 | Wong et al. |
| 5,600,144 A | 2/1997 | Worstell |
| 6,194,728 B1 | 2/2001 | Bosnjakovic |
| 6,710,349 B2 | 3/2004 | Shao |
| 6,749,761 B1 | 6/2004 | Andreaco et al. |
| 6,784,448 B2 | 8/2004 | Neriishi |
| 6,956,214 B2 * | 10/2005 | Wong et al. .................. 250/368 |
| 7,098,463 B2 | 8/2006 | Adamovics |
| 7,157,014 B1 | 1/2007 | Andreaco et al. |
| 7,180,074 B1 | 2/2007 | Crosetto |
| 7,692,156 B1 | 4/2010 | Nagarkar |
| 8,080,801 B2 | 12/2011 | Safai |
| 2003/0034455 A1 | 2/2003 | Schreiner |
| 2003/0226972 A1 | 12/2003 | Wong et al. |
| 2004/0195512 A1 | 10/2004 | Crosetto |
| 2005/0104000 A1 | 5/2005 | Kindem |
| 2005/0109943 A1 | 5/2005 | Vaquero |
| 2005/0113536 A1 | 5/2005 | Armstrong et al. |
| 2005/0167605 A1 | 8/2005 | Juni |
| 2006/0192308 A1 | 8/2006 | Juni |
| 2009/0001273 A1 | 1/2009 | Hawman |
| 2009/0173885 A1 | 7/2009 | Zeitler et al. |
| 2009/0294683 A1 | 12/2009 | Perna |
| 2010/0127180 A1 | 5/2010 | Lifshitz |
| 2010/0187425 A1 | 7/2010 | Majewski |
| 2012/0223252 A1 | 9/2012 | Menge |
| 2014/0099465 A1 | 4/2014 | Zerrouk et al. |

OTHER PUBLICATIONS

Kent Burr, Adrian Ivan, Don Castleberry, Jim Leblanc, Design of Scintillator Arrays for Dual-End Depth-of-Interaction Encoding Small-Animal PET Detectors, Jul. 27, 2007.

International Searching Authority, International Search Report (International application No. PCT/IB2013/002779), date of mailing Apr. 10, 2014.

* cited by examiner

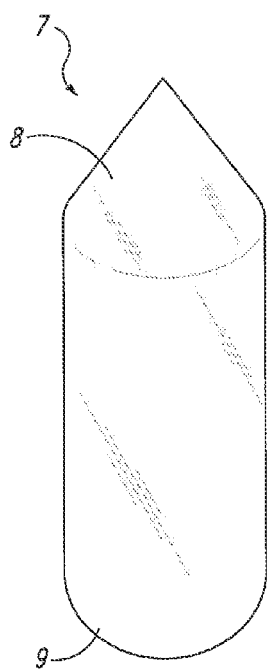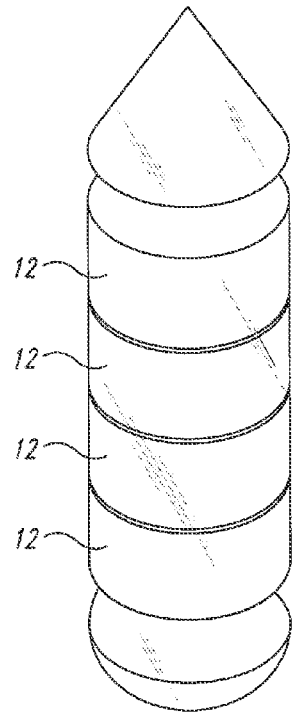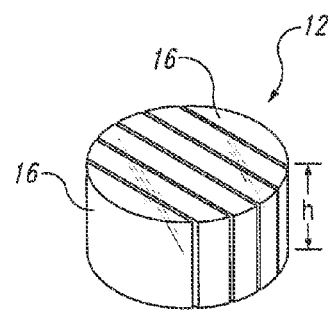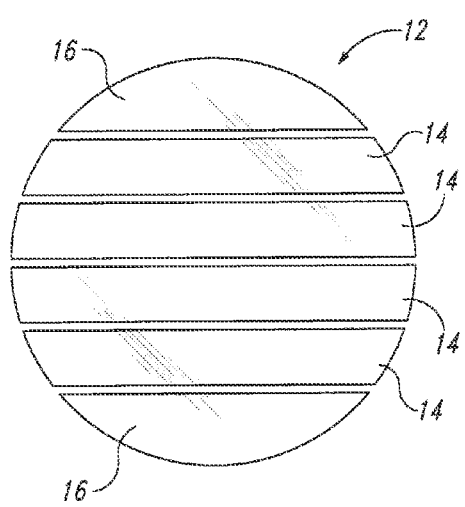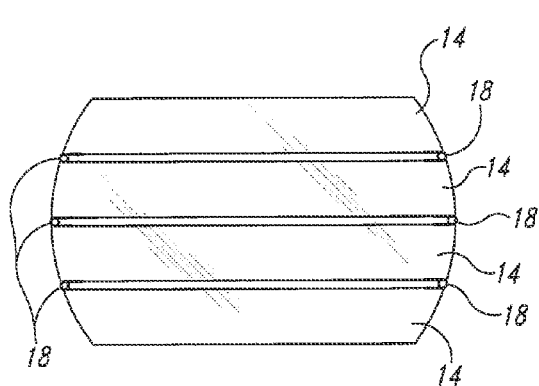
Fig. 1A
Fig. 1B
Fig. 1C
Fig. 2
Fig. 3

CRYSTAL BLOCK ARRAY AND METHOD OF MANUFACTURE

CROSS-REFERENCE TO RELATED APPLICATIONS

This application is a continuation-in-part of U.S. application Ser. No. 14/051,328 filed Oct. 10, 2013, which claims the benefit of priority to U.S. Provisional Application No. 61/712,181 filed on Oct. 10, 2012. These applications are incorporated herein by reference in their entireties for all purposes.

TECHNICAL FIELD

The present invention relates generally to scintillation crystals and related crystal block assemblies used in Positron Emission Tomography (PET) scanners and, more particularly, to scintillation crystal block arrays (configured for coupling with photodetectors as part of an integrated detector module useful in advanced PET scanner systems), as well as to methods of making and using high performance scintillation crystal block arrays.

BACKGROUND

In nuclear medicine, scintillation crystals have become important components of medical imaging devices. The performance of these medical imaging devices, including Positron Emission Tomography (PET) scanners, largely depends on the quality and uniformity of scintillation crystals and on related crystal block array assemblies. The cost of making such medical imaging devices is generally expensive. Thus, there is a need to reduce manufacturing costs by simplifying the procedures for making scintillation crystal block arrays.

In a general sense, positron emission tomography is a medical imaging technique in which a patient ingests a radioactively tagged compound that mimics a naturally occurring compound. For reasons relating to the body's metabolism, the compound tends to accumulate in tumors. The radioactively tagged compounds tend to emit gamma rays. The gamma rays can be detected outside of the patient's body. In particular, when the scintillation crystals are struck by a gamma ray, they are likely to emit a photon ("scintillation"). The photon is in turn recognized by a photodetector, which generates an electronic signal. Various hardware and software components use the electronic signal to reconstruct the likely position (within a known tolerance) of the original gamma ray emission.

In accordance with known methods of making a crystal block array, a scintillation crystal boule may be cut and polished to generate a plurality of individual scintillation crystal pixels that are then each surrounded by Teflon tape and grouped into a crystal block array. In accordance with other known methods, a reflective sheet material matrix may be defined, and individual scintillation crystal pixels can be disposed within slots defined by the sheet material matrix. However, these methods produce crystal block arrays that include gaps and inconsistently packed pixels.

Better crystals and more uniform crystal block arrays provide better information about the gamma rays and thus provide a better image, and help lead to a better diagnosis, and potentially better medical treatment. Accordingly, and although some progress has made with respect to the development of crystal block arrays, there is still a need in the art for new crystal block arrays and related methods of manufacture to overcome the deficiencies and obstacles discussed above.

SUMMARY

The present invention in an embodiment is directed to a novel method of making a crystal block array. The inventive method comprises at least the steps of: providing a selected crystal having a generally cylindrical form; cutting the selected crystal crosswise a plurality of times to yield a plurality of crystal pucks, with each crystal puck having a selected height; cutting at least one of the plurality of crystal pucks along a heightwise direction a plurality of times to yield a plurality of first crystal slabs; polishing the flat surfaces of at least two of the plurality of first crystal slabs to an optical finish; applying a first reflective sheet material on at least one face of the at least two of the plurality of first crystal slabs, thereby defining a first layered optical block assembly; cutting the first layered optical block assembly along a lengthwise direction a plurality of times to yield a plurality of second crystal slabs of sandwich construction; polishing the flat surfaces of at least two of the plurality of second crystal slabs of sandwich construction to an optical finish; and applying a second reflective sheet material on at least one face of the at least two of the plurality of second crystal slabs of sandwich construction, thereby defining a crystal block array.

These and other aspects of the present invention will become more evident upon reference to the following detailed description and accompanying drawings. It is to be understood, however, that various changes, alterations, and substitutions may be made to the specific embodiments disclosed herein without departing from their essential spirit and scope.

BRIEF DESCRIPTION OF THE DRAWINGS

The drawings are intended to be illustrative and symbolic representations of certain exemplary embodiments of the present invention (namely, the manufacture of an exemplary 4×4 pixelated crystal block array useful for operations within a PET scanner) and as such are not necessarily drawn to scale. In addition, the relative dimensions and distances depicted in the drawings are exemplary and may be varied in numerous ways. Finally, like reference numerals have been used to designate like features throughout the views of the drawings.

FIG. 1A is a perspective view of a selected crystal boule.

FIG. 1B is a perspective exploded view of the crystal boule shown in FIG. 1A, but wherein the crystal boule has had its top and bottom portions cut-off and removed.

FIG. 1C is a perspective view of one of the crystal pucks shown in FIG. 1B, but wherein the crystal puck has been cut lengthwise a plurality of times to yield a plurality of crystal slabs in accordance with an embodiment of the present invention.

FIG. 2 is a top plan view of the sliced crystal puck shown in FIG. 1C.

FIG. 3 is a top plan view of the sliced crystal puck shown in FIGS. 1C and 2, but wherein the two outermost crescent-shaped slabs have been removed and a plurality of first wires (spacers) have been placed between the slabs and at their outer edges in accordance with an embodiment of the present invention.

DETAILED DESCRIPTION OF THE PREFERRED EMBODIMENTS

Figure 4:
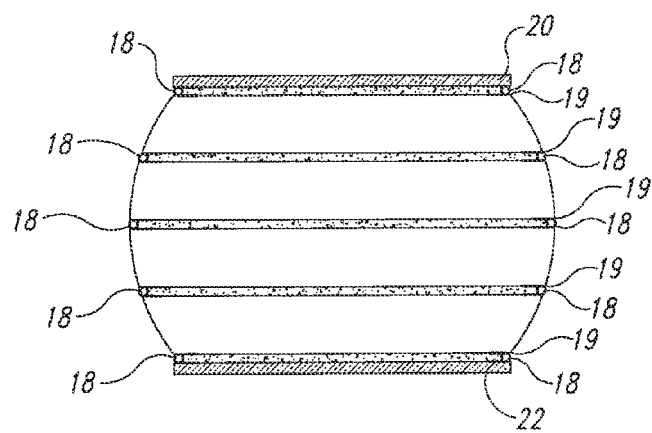
FIG. 4 is a top plan view of the sliced and spaced apart slabs shown in FIG. 3, but wherein a bonding agent has been placed in between each of the slabs, and between first and second glass end plates positioned adjacent to the outermost slabs to form a "sandwich" block in accordance with an embodiment of the present invention.

Referring now to the drawings where like numerals have been used to designate like features throughout the views, and more specifically to FIGS. 1A through 10, the present invention in an embodiment is directed to a novel method of making a scintillation crystal block array 10 (as shown in Figures and 9 and 10) adapted for coupling with a planar photodetector array (not shown) as part of an integrated detector module useful in an advanced PET scanner system (not shown). In the inventive method and as an initial step, a crystal boule 7 (FIG. 1A) of an appropriately grown and sized scintillation crystal (such as, for example, a cerium-activated lutetium-based oxyorthosilicate scintillation crystal boule (Ce:LSO and/or Ce:LYSO) grown by the Czochralski method) is first selectively sliced (cut) into a plurality of "pucks" (FIG. 1B). In other words, a selected scintillation crystal boule 7 of a generally cylindrical form is cut a plurality of times along its width (perpendicular to its longitudinal axis) to yield a plurality of pucks 12. The plurality of pucks 12 that are cut (sliced) from the selected cylindrical crystal boule 7 may or may not be of the same height. The cutting or slicing of the crystal boule 7 may be carried out with the aid of an appropriate cutting tool such as, for example, a diamond hardened saw. In addition, the height of each puck 12 is typically selected to be equal to the length of the individual scintillation crystal pixels 11 (utilized in a particular PET scanner) plus a minor allowance for grinding/polishing. Scintillation crystal pixels utilized in advanced PET scanners generally have dimensions of about 4×4×20 millimeters (mm) or about 4×4×22 millimeters (mm) or about 4.7×6.3×30 millimeters (mm), but are not limited to those exemplary dimensions. Accordingly, the present invention is not limited to any particular crystal or pixel dimension or range of dimensions and is applicable to the manufacture of scintillation crystal block arrays of various sizes and dimensions. For example, the inventive method is useful for making all types arrays having any number of rows and columns (2×2, 3×3, 4×4, 4×6, et cetera).

As best shown in FIGS. 1C and 2, a puck 12 having a selected height (h) is further sliced (cut) along its height (parallel to its longitudinal axis) to yield a plurality of inner "slabs" 14 positioned between a pair of opposing end slab pieces 16. The pair of opposing end slab pieces 16 are removed and set aside for other applications. The remaining inner slabs 14 are each further lapped and polished on all of their flat surfaces (preferably to at least an optical finish of it/8 or better) and readied for further assembly.

As best shown in FIG. 3, the inner slabs 14 are reassembled back into the shape of the puck 12 (less the removed pair of opposing end slab pieces 16), but spaced apart from each other by means of first height-wise wires 18 selectively positioned between the slabs 14 and along their outer edges as shown. The first wires 18 are of a selected diameter that preferably ranges from about 0.1 mm to 1.0 mm, or preferably from about 0.5 mm to 0.6 mm. The diameter of the wires 18 corresponds to the distance between adjacent pixels 11 of the final crystal block array 10. The wires 18 may be metallic or polymeric, and in some embodiments are composed of nylon.

Figure 5:
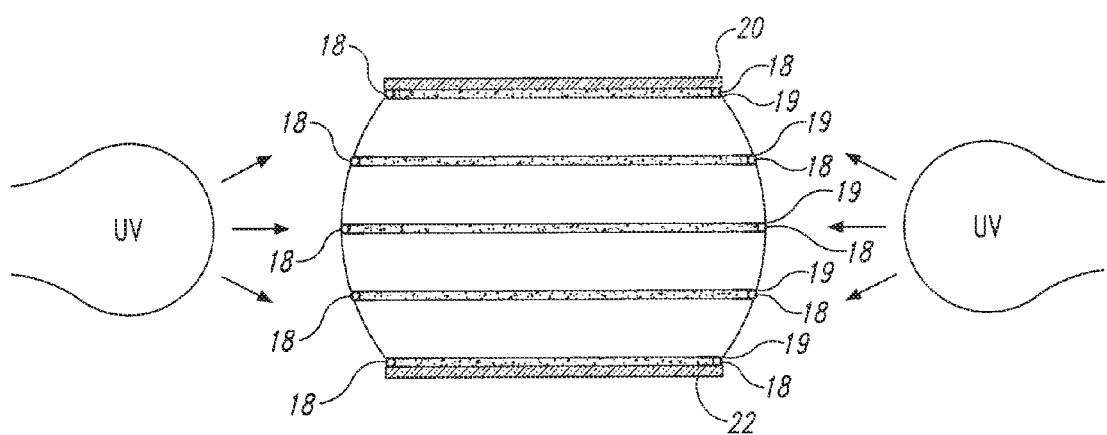
FIG. 5 is a top plan view of the bonded together slabs and glass end plates shown in FIG. 4, but wherein UV light is being applied to facilitate curing of the bonding agent in accordance with an embodiment of the present invention.

Next and as shown in FIG. 4, a curable liquid or semi-liquid bonding agent 19 (such as, for example, an optical cement made of a barium sulphate composition) is applied between each of the spaced apart slabs 14 and between first and second glass end plates 20, 22 that have been positioned adjacent to the two outermost slabs 14, all of which together form a "sandwich" block. As shown in FIG. 5, the bonding agent (cement) 19 positioned within the sandwich block is subsequently cured (hardened) by exposure to UV light for a selected period of time. In this regard, curing times are generally a function of at least the type of bonding agent used, its applied thickness, and on the intensity of the light source. Accordingly, curing times may be as short as five minutes or as long as several hours.

Figure 6:
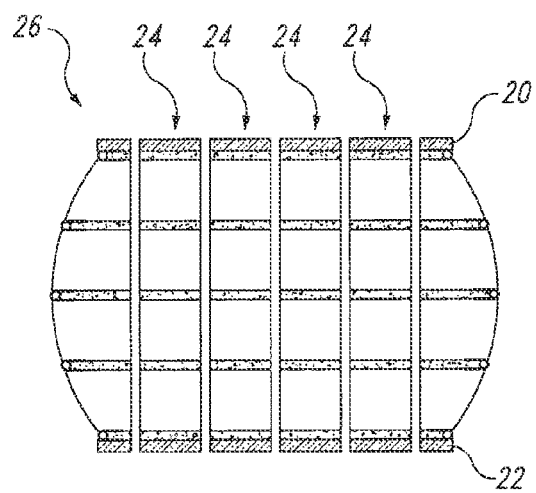
FIG. 6 is a top plan view of the bonded together slabs and glass end plates shown in FIG. 5, but after exposure to UV light and wherein the slabs have been cut lengthwise a plurality of times and in a transverse direction to the first plurality of lengthwise cuts to yield a plurality of crystal pixels (second slabs of sandwich construction) and a pair of outer pixel end pieces in accordance with an embodiment of the present invention.

Next and as shown in FIG. 6, the cured sandwich block 24 is selectively sliced (cut) a plurality of times perpendicular to the first and second protective glass end plates 20, 22 (as well as to the inner bonded together first slabs 14) to yield a plurality of second slabs of sandwich construction 24, and a pair of opposing end second slab pieces 26. The pair of opposing end second slab pieces 26 are removed and set aside for other applications. The remaining inner second slabs of sandwich construction 24 are each further lapped and polished on all of their flat surfaces (preferably to at least an optical finish of λ/8 or better) and readied for further assembly.

Figure 7:
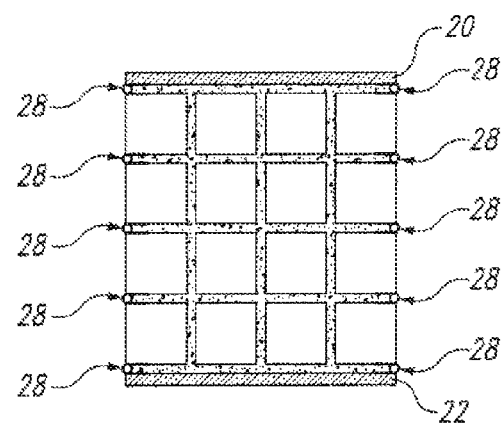
FIG. 7 is a top plan view of the plurality of crystal pixels (second slabs of sandwich construction) shown in FIG. 6, but wherein a plurality of second wires (spacers) have been placed between the second segmented slabs of sandwich construction and at their outer edges in accordance with an embodiment of the present invention.

As shown in FIG. 7, the inner second slabs of sandwich construction 24 are reassembled back into the shape of an unfinished crystal block array (less the removed pair of opposing end second slab pieces 26), but spaced apart from each other by means of second height-wise wires 28 selectively positioned between the second slabs of sandwich construction 24 and along their outer edges (and adjacent to the first and second glass end plates 20, 22, which have now been cut as described above) as shown. The plurality of second wires 28 may or may not be the same diameter as the plurality of first wires 18.

Figure 8:
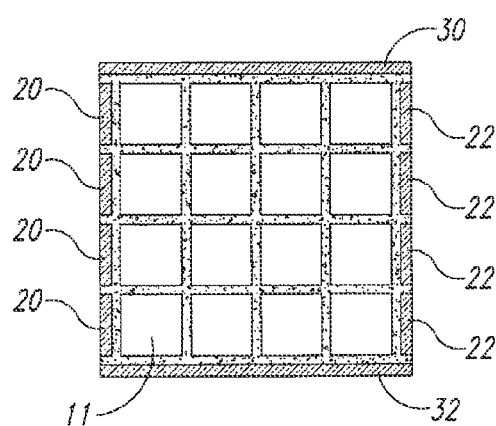
FIG. 8 is a top plan view of the unfinished crystal block array of FIG. 7, but wherein opposing third and fourth protective glass plates have been added and further bonding agent has been added.
Figure 9:
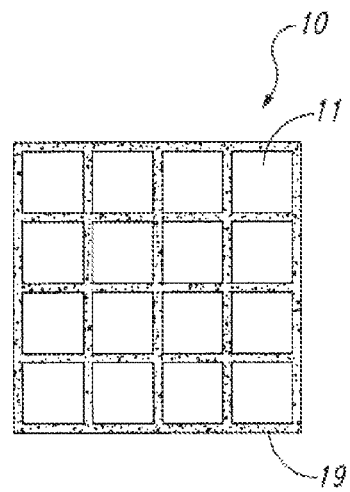
FIG. 9 is a top plan view of a crystal block array in accordance with an embodiment of the present invention.
Figure 10:
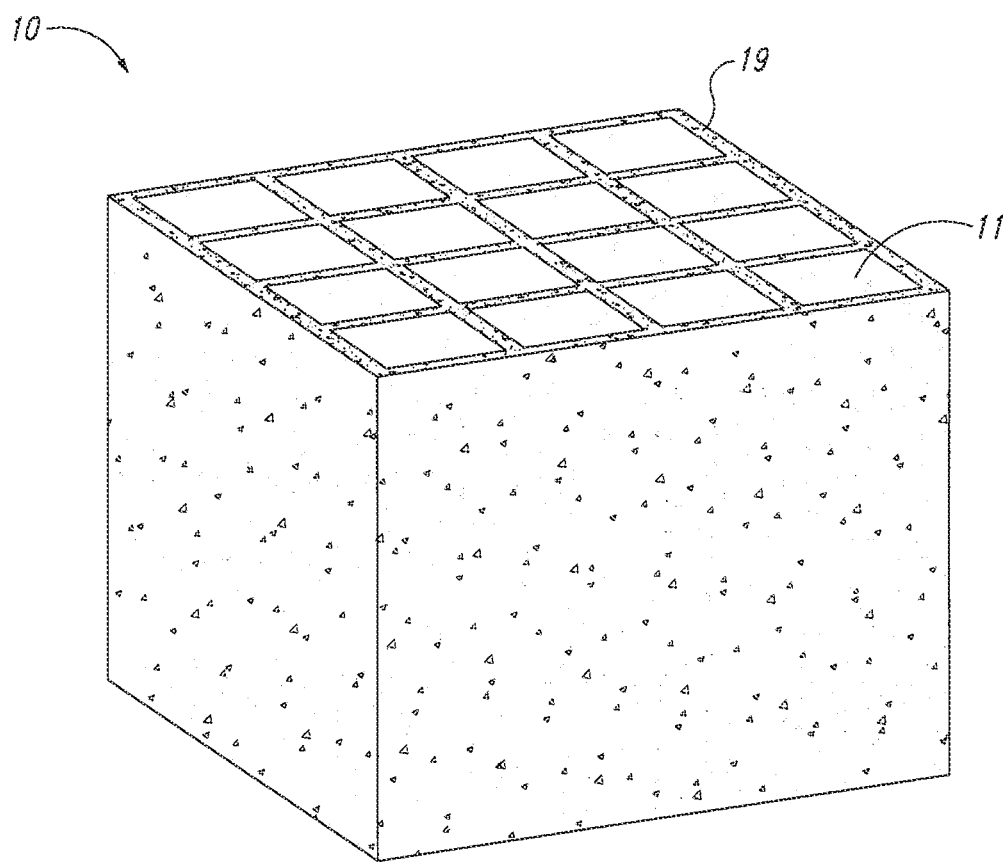
FIG. 10 is a perspective view of the crystal block array shown in FIG. 9.

Next and as shown in FIG. 8, a pair of opposing third and fourth protective glass end plates 30, 32 are similarly positioned adjacent to and spaced apart from the unfinished crystal block array, and thereafter additional bonding agent 19 is poured into the space therebetween and subsequently cured as before. The first, second, third, and fourth protective glass end plates 20, 22, 30, 32 are all removed by use a diamond plate tool, for example, and all of the surfaces are cleaned to thereby yield (as shown in FIGS. 9 and 10) a crystal block array 10 having highly uniform and controlled spacing between individual pixels 11.

In some embodiments, alternative materials may be used to surround individual pixels 11 instead of bonding agent 19. For example, pixels 11 may be surrounded by a reflective sheet material such as a film or tape. In one preferred embodiment, 3M Radiant Mirror Film VM 2000 (3M Company, Minnesota) is used. Manufacturing steps including the use of spacers or wires 18 may be absent in various embodiments where a reflective sheet material is used.

Figure 11:
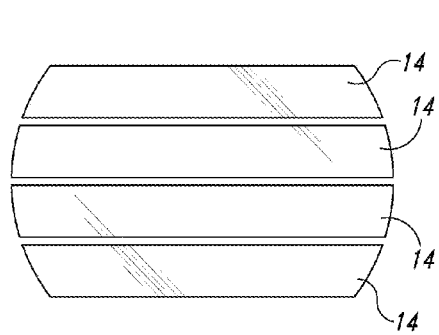
FIG. 11 is a top plan view of the sliced crystal puck shown in FIGS. 1C and 2, but wherein the two outermost crescent-shaped slabs have been removed.
Figure 12:
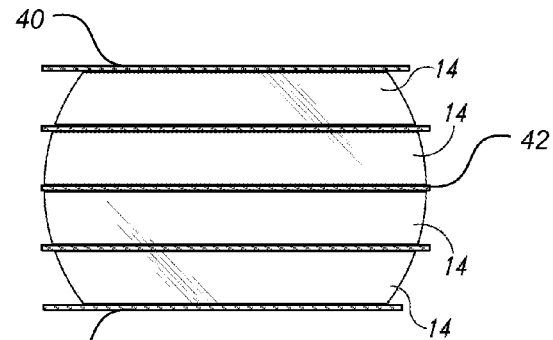
FIG. 12 is a top plan view of reflective sheet material stacked between crystal slabs of FIG. 11.
Figure 13:
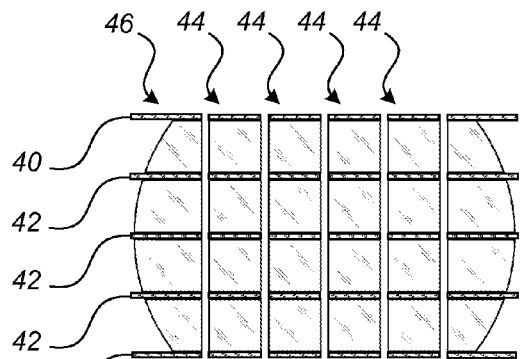
FIG. 13 is a top plan view of the stack of FIG. 12 that has been cut lengthwise a plurality of times and in a transverse direction to the first plurality of lengthwise cuts to yield a plurality of crystal pixels (second slabs of sandwich construction).
Figure 14:
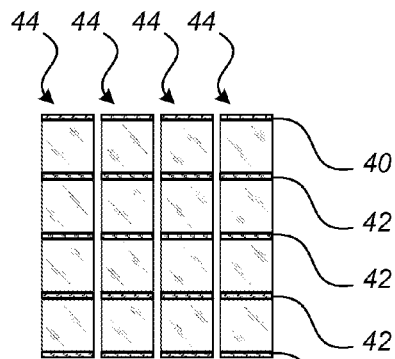
FIG. 14 is a top plan view of the second slabs of sandwich construction of FIG. 13 with crescent-shaped slabs removed.

Accordingly, referring to FIG. 11 crescent-shaped slabs 16 can be removed from the sliced crystal puck 12 shown in FIGS. 1C and 2. As shown in FIG. 12, the remaining slabs 14 may be stacked with first reflective sheet material 42 between each of the slabs 14. and with first reflective sheet material 40 at the ends of the stack. In various embodiments, an adhesive may be applied between respective faces of reflective sheet material 40, 42, and respective faces of the slabs 14 so that the slabs 14 and reflective sheet material 40, 42 are rigidly coupled. Such a stack may be cut into second slabs of sandwich construction 44, 46 as depicted in FIG. 13. Crescent-shaped second slabs of sandwich construction 46 may be removed as shown in FIG. 14 and cut faces of the second slabs of sandwich construction 44 may be polished to an optical finish.

Figure 15:
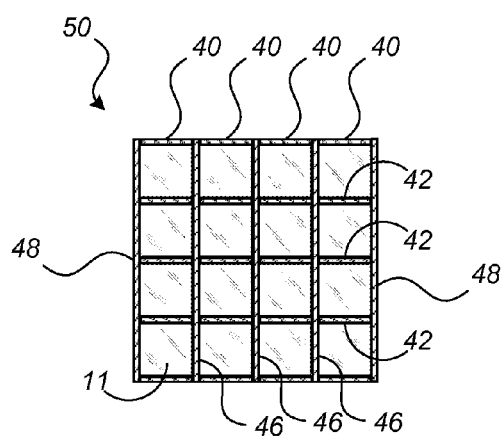
FIG. 15 is a top plan view of a crystal block array in accordance with an embodiment of the present invention where reflective sheet material is stacked between the second slabs of sandwich construction of FIG. 14 to define the crystal block array.
Figure 16:
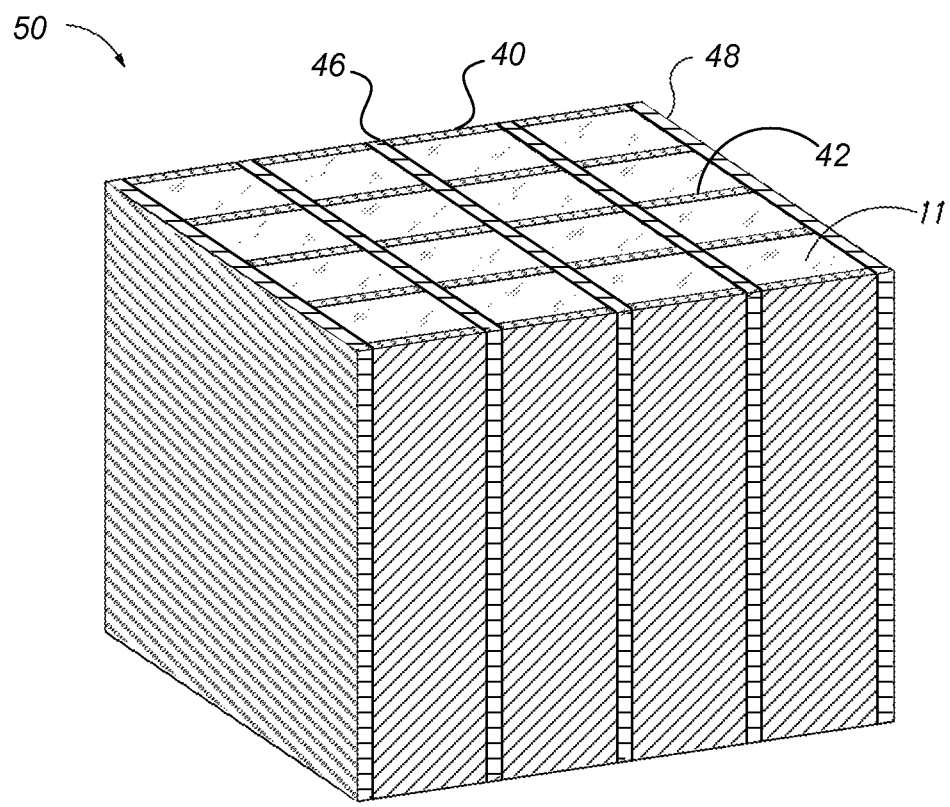
FIG. 16 is a perspective view of the crystal block array shown in FIG. 15.

The second slabs of sandwich construction 44 may be further stacked with a second reflective sheet material 46 between each of the second slabs of sandwich construction 44 and with second reflective sheet material 48 at the ends of the stack to yield a crystal block array 10 as depicted in FIGS. 15 and 16. The first and second reflective sheet materials may be the same or different in some embodiments.

In various embodiments, an adhesive may be applied between respective faces of reflective sheet material 46, 48, and respective faces of the second slabs of sandwich construction 44 so that the second slabs of sandwich construction 44 and reflective sheet material 46, 48 are rigidly coupled. An optical adhesive may be selected having desirable qualities. In some embodiments, an adhesive may require curing or other treatment, which may include heating, drying, or exposure to light, including ultraviolet light. Accordingly, in some embodiments, a production method may include one or more step of curing or treating an applied adhesive.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A method of making a crystal block array, comprising at least the steps of:
   providing a selected crystal having a generally cylindrical form;
   cutting the selected crystal crosswise a plurality of times to yield a plurality of crystal pucks, with each crystal puck having a selected height;
   cutting at least one of the plurality of crystal pucks along a heightwise direction a plurality of times to yield a plurality of first crystal slabs;
   polishing the flat surfaces of at least two of the plurality of first crystal slabs to an optical finish;
   applying a first reflective sheet material on at least one face of the at least two of the plurality of polished first crystal slabs;
   placing the at least two of the plurality of polished first slabs in a side-by-side relationship to thereby define, a first layered optical block assembly;
   cutting the first layered optical block assembly along a lengthwise direction a plurality of times to yield a plurality of second crystal slabs of sandwich construction;
   polishing the flat surfaces of at least two of the plurality of second crystal slabs of sandwich construction to an optical finish;
   applying a second reflective sheet material on at least one face of the at least two of the plurality of polished second crystal slabs of sandwich construction; and
   placing the at least two of the plurality of polished second crystal slabs of sandwich construction in a side-by-side relationship to thereby define a crystal block array.

2. The method of claim 1 wherein the selected crystal is a boule of a scintillation substance.

3. The method of claim 1, wherein applying the first reflective sheet material between the at least two of the plurality of polished first crystal slabs comprises applying a first adhesive between respective first reflective sheet material and polished first crystal slabs.

4. The method of claim 3, further comprising curing the first adhesive.

5. The method of claim 4, wherein curing the first adhesive comprises exposure to ultraviolet light.

6. The method of claim 3, wherein applying the second reflective sheet material between the at least two of the plurality of polished second crystal slabs of sandwich construction comprises applying a second adhesive between respective second reflective sheet material and polished second crystal slabs.

7. The method of claim 6, wherein the first and second adhesive are the same adhesive.

8. The method of claim 1 wherein the first and second reflective sheet materials are the same material.

9. The method of claim 1 wherein the first and second reflective sheet material each comprise 3M Radiant Mirror Film VM 2000.

10. A crystal block array made in accordance with the method of claim 1.

* * * * *